United States Patent

[11] 3,601,656

[72] Inventors Bob H. Smith
Berkeley;
Louis L. Reginato, Orinda, both of, Calif.

[21] Appl. No. 51,239
[22] Filed June 30, 1970
[45] Patented Aug. 24, 1971
[73] Assignee The United States of America as represented by the United States Atomic Energy Commission

[54] SILICON DIODE PROTECTION MEANS
7 Claims, 1 Drawing Fig.

[52] U.S. Cl. .......... 317/13 R, 174/35 R, 174/50.54, 317/61, 307/110
[51] Int. Cl. .......... H02h 7/10, H05k 9/00
[50] Field of Search .......... 307/110; 321/15; 328/259; 317/13 R, 61; 174/35 R, 50.54

[56] References Cited

UNITED STATES PATENTS

| | | | |
|---|---|---|---|
| 3,123,760 | 3/1964 | Wouk .......... | 321/15 (X) |
| 3,505,533 | 4/1970 | Bernstein .......... | 307/110 |

*Primary Examiner*—William H. Beha, Jr.
*Assistant Examiner*—Harvey Fendelman
*Attorney*—Roland A. Anderson

ABSTRACT: A means for protecting silicon diodes in high voltage power supplies from overload damage. Current limiting resistors and a parallel spark gap provide protection against excessive forward current while shielding and the spark gap protect against excessive back voltages generated either directly or by electromagnetic waves.

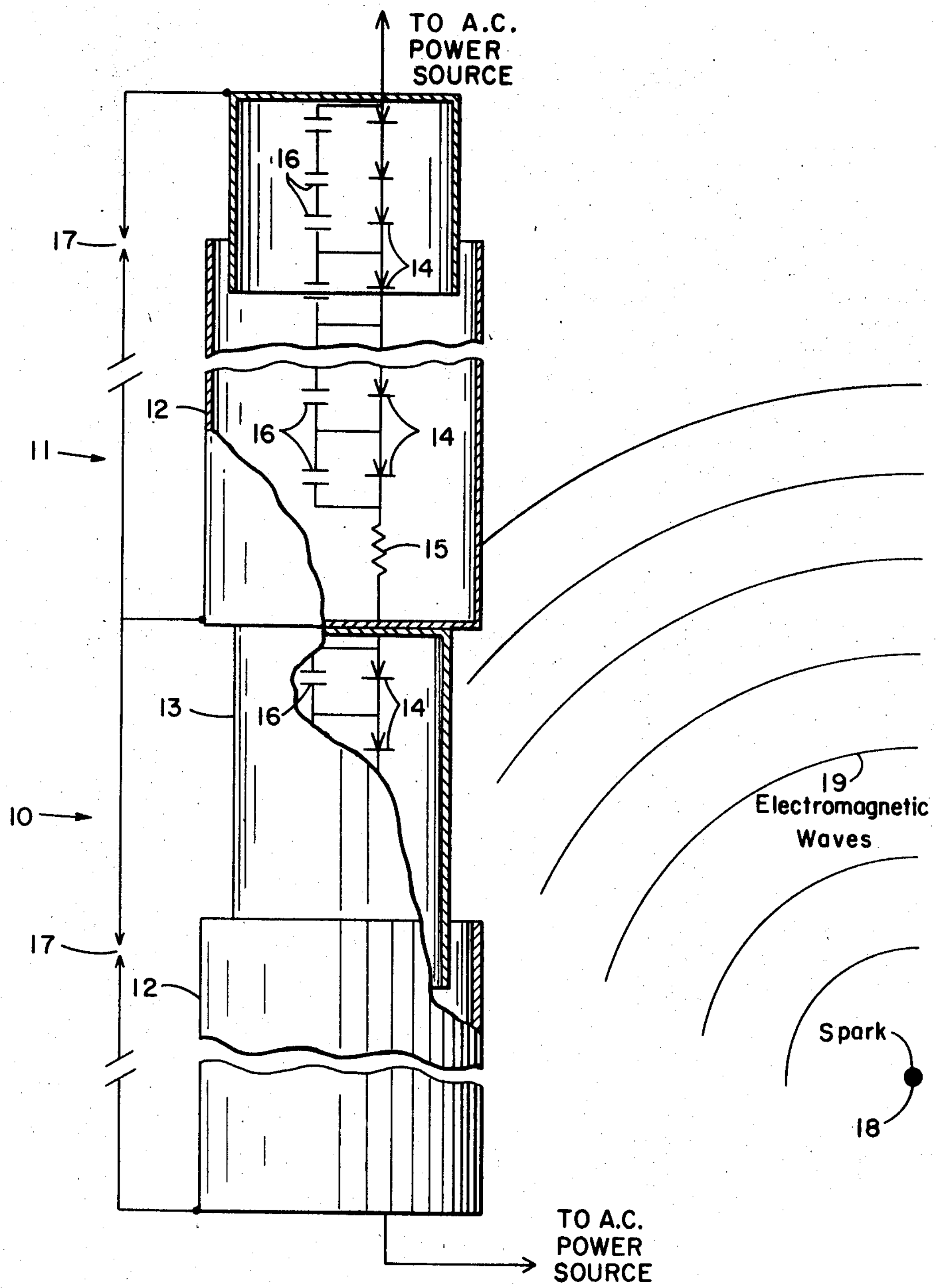
INVENTOR.
BOB H. SMITH
BY LOUIS L. REGINATO
Roland A. Anderson
Attorney

SILICON DIODE PROTECTION MEANS

BACKGROUND OF THE INVENTION

The invention described herein was made in the course of, or under, Contract No. W-7405-Eng-48, with The United States Atomic Energy Commission.

This invention relates to burnout protection means for fast recovery silicon diodes used in high voltage power supplied, such as the voltage multiplier in a Cockcroft-Walton accelerator. In such high voltage supplies, many series connected diodes provide switching to place a charge across each capacitor in two series connected strings of capacitors therein, adding up to a very high total potential across the strings of capacitors. The general operation of such a voltage multiplier is set forth on pages 291–293 of the Sourcebook On Atomic Energy, Third Edition, S. Glasstone, 1967.

Prior to the present invention it has been generally considered that silicon diodes were unsatisfactory in such service, the diodes being frequently destroyed by current overloads. In the past, when resistors were connected in series with the diodes to limit the current and protective spark gaps were connected in parallel with groups of diodes, the diodes continued to burn out, though the resistors and spark gaps did aid in protecting the diodes against certain kinds of electrical overloads.

SUMMARY OF THE INVENTION

While the above mentioned prior use of series connected resistors and parallel connected spark gaps did serve in protecting the diodes under some conditions, it was found by the inventors of the present invention that when an arc occurred in the vicinity of the diodes, the electromagnetic waves from the arc could induce sufficient back voltage across the diodes to exceed the Zener breakdown potential, thereby damaging the diodes. It was then further discovered that placing a shield over the diodes, together with the spark gaps, prevented excessive back voltage from appearing across the diodes. Therefore, the series resistors and spark gaps coact to protect the diodes against excessive forward current while the shielding and spark gaps coact to protect the diodes from encountering excessive voltage.

Therefore, it is an object of the invention to provide a means for protecting silicon diodes from damage in very high voltage power supplies.

A further object of the invention is to provide a means for protecting silicon diodes from either current overload in the forward direction or exceeding the Zener breakdown voltage in the reverse direction.

Another object of the invention is to provide a burnout protection means for fast recovery silicon diodes used in high voltage power supplies comprising the combined use of series resistors, spark gaps, and shielding which cooperate to prevent forward overload current and excessive back voltage or an electromagnetic wave.

Other objects of the invention will become readily apparent from the following description and accompanying drawing.

BRIEF DESCRIPTION OF THE DRAWING

The single FIGURE is a partial cross-sectional, partial schematic view illustrating the invention.

DESCRIPTION OF THE INVENTION

Prior to describing the illustrated embodiment of the invention, it is pointed out that the invention is a means for protecting silicon diodes from damage in very high voltage power supplies, for example, about 100,000 to 20,000,000 volts, such as voltage multipliers used as particle accelerators such as the Cockcroft-Walton accelerator referenced above. It has been found that diode damage in such uses may result from either current overload in the forward direction or from exceeding the Zener Breakdown voltage in the reverse direction. The latter condition is found to occur from direct overvoltage or from an electromagnetic wave generated by a nearby spark. Suitable shielding and protective parallel spark gaps prevent electromagnetic waves from inducing a reverse breakdown voltage in the diodes. The spark gaps also protect against direct overvoltage. Forward current overload is prevented both by the spark gaps and by connecting current limiting resistors in series with the diodes.

Referring now to the drawing, a pair of series connected shielding sections 10 and 11 incorporating the invention is illustrated, although a single section or many sections can be utilized, depending on the application thereof and the voltage required of the power supply. As shown, each of the shielding sections 10 and 11 comprises cylindrical cup-shaped coaxial conductive shields 12 and 13, shield 13 of section 10 being abutted against shield 12 of section 11 so as to provide electrical contact therebetween. Shields 13 are of a smaller diameter or cross section than shields 12 and are positioned such that the outer ends thereof overlap with the outer ends of shields 12, as shown, but in spaced relation thereto. While not shown, nonconductive spider or other type support means may be utilized intermediate conductive shields 12 and 13 to maintain the desired positional relationship therebetween. Positioned within each of shielding sections 10 and 11 is a multiplicity of diodes 14 (40 to 50 for example) connected in series to form a diode string, one end of the diode string being electrically connected to shield 12 through a current-limiting resistor 15 and the other end being electrically connected to shield 13. Voltage dividing capacitors 16 are connected in parallel with the diodes 14 and form therewith a Cockcroft-Walton-type accelerator, the details and operation thereof being known in the art and not constituting part of this invention. The string of diodes 14 in section 10 are connected serially with the diodes 14 in section 11 via the abutting connection of conductive shields 13 and 12, respectively of sections 10 and 11, and current limiting resistor 15. As known, in such high voltage power supplies, the many series connected diodes 14 provide switching to place a charge across each capacitor 16 in the two series connected strings of capacitors, adding up to a very high total potential across the strings of capacitors. The shield 12 of section 10 and shield 13 of section 11 are connected as indicated by arrow and legend to an AC power source normally utilized with this type of high voltage power supply.

A spark gap 17 is connected across each section 10 and 11 and will breakdown if an excessively high potential is applied across the diodes 14 in the section across which it is connected. When the overvoltage polarity causes forward conduction of the diodes 14, the resistor 15 limits the diode current to a safe value up to the voltage at which the spark gap 17 breaks down. If an external arc or spark occurs at point 18, for instance, the shields 12 and 13 prevent electromagnetic waves or rapidly changing electric fields 19 from reaching the diodes 14. Further protection is provided by the spark gap 17 which will breakdown when an extremely high potential occurs between the shields 12 and 13 due to the external electromagnetic waves 19. The shields 12 and 13 should overlap as shown to more fully protect the diodes 14, but must not, of course, provide a path for current in parallel with the diodes 14.

It has thus been shown that the present invention provides an effective means for protecting silicon diodes from damage in very high voltage power supplies such as voltage multipliers or direct current rectifiers used, for example, in direct current particle accelerators. This is accomplished by the novel utilization and combination of current-limiting resistors, parallel spark gaps, and conductive shielding, whereby the silicon diodes are protected from excessive forward current as well as excessive back voltages, whether the back voltage be generated directly or by electromagnetic waves. Thus, the present invention has provided an advancement in the art by a protective means which makes the use of fast recovery silicon diodes practical in high voltage circuits.

While a particular embodiment of the invention has been illustrated and described, modifications will become apparent to those skilled in the art, and it is intended to cover in the appended claims all such modifications as come within the spirit and scope of the invention.

What we claim is:

1. Means for protecting silicon diodes utilized in high voltage power supplies against excessive forward current and excessive back voltages comprising: a pair of conductive shield means, one of said shield means being smaller in cross section than the other of said pair, said one shield means being positioned partially within said other shield means to form a spaced overlapping relationship therebetween, spark gap means operatively connected across said pair of shield means, a plurality of series connected silicon diode means forming a diode string positioned within said pair of shield means with one end of said diode string electrically connected to one of said pair of shield means and the opposite end of said diode string electrically connected to the other of said pair of shield means through a current-limiting resistor means, a plurality of voltage dividing capacitor means positioned within said pair of shield means and electrically connected in parallel with said diode means, and means connecting said pair of shield means to an associated power source, whereby said diode means are protected from excessive forward current by said spark gap means and said current-limiting resistor means, and protected from excessive back voltages by said pair of shielding means and said spark gap means.

2. The protection means defined in claim 1, wherein said pair of shield means are each cylindrical in cross section having one open end and one closed end, said shield means being coaxially aligned with said open ends of said pair of shield means forming the said spaced overlapping relationship therebetween, said one end of said diode string and said current-limiting resistor means being electrically connected to the closed ends of said pair of shield means.

3. The protection means defined in claim 2, wherein said one end of said diode string is electrically connected to the closed end of said one of said pair of shield means, said current-limiting resistor means being electrically connected to the closed end of said other of said pair of shield means, and wherein said spark gap means is electrically connected across said closed ends of said pair of shield means.

4. The protection means defined in claim 1, wherein said one end of said diode string is electrically connected to said one of said pair of shield means, and wherein said current-limiting resistor means is electrically connected to said other of said pair of shield means.

5. The protection means defined in claim 4, wherein said spark gap means is electrically connected across opposite ends of said pair of shield means.

6. The protection means defined in claim 1, additionally including at least a second pair of conductive shield means, said smaller cross section shield means of one of said pairs of shield means being positioned in electrical contact with the larger cross section shield means of another of said pairs of shield means, each pair of shield means being provided with internally located silicon diode means forming series diode strings electrically interconnected through said electrical contact between said shield means of said pairs of shield means and through current-limiting resistors, each of said pair of shield means being provided with spark gap means thereacross, said means connecting to an associated power supply being connected to one shield means of each of said pair of shield means.

7. The protection means defined in claim 7, wherein each shield means of each of said pair of shield means is constructed to defined a cylindrical cup-shaped member having a closed bottom portion and an open upper portion, said closed bottom portion of the smaller cross section member of one pair of shield means being mounted in abutment with the closed bottom portion of the larger cross section member of the another pair of shield means defining the electrical contact therebetween.